(12) United States Patent
Bex et al.

(10) Patent No.: US 9,630,592 B2
(45) Date of Patent: Apr. 25, 2017

(54) WIPING DEVICE, IN PARTICULAR WIPING DEVICE FOR A MOTOR VEHICLE PANE

(75) Inventors: Koen Bex, Jeuk/Limburg Belgien (BE); Helmut Depondt, Kessel-Lo (BE); Dirk Herinckx, Dries-Linter (BE)

(73) Assignee: Robert Bosch GmbH, Stuttgart (DE)

( * ) Notice: Subject to any disclaimer, the term of this patent is extended or adjusted under 35 U.S.C. 154(b) by 173 days.

(21) Appl. No.: 14/130,024

(22) PCT Filed: May 29, 2012

(86) PCT No.: PCT/EP2012/059972
§ 371 (c)(1),
(2), (4) Date: Dec. 30, 2013

(87) PCT Pub. No.: WO2013/000649
PCT Pub. Date: Jan. 3, 2013

(65) Prior Publication Data
US 2014/0130286 A1    May 15, 2014

(30) Foreign Application Priority Data
Jun. 28, 2011   (DE) .................. 10 2011 078 183

(51) Int. Cl.
*B60S 1/38*      (2006.01)
(52) U.S. Cl.
CPC ............ *B60S 1/381* (2013.01); *B60S 1/3881* (2013.01)
(58) Field of Classification Search
CPC ....... B60S 1/381; B60S 1/3881; B60S 1/3806
USPC .................................................. 15/250.201
See application file for complete search history.

(56) References Cited

U.S. PATENT DOCUMENTS

| | | | |
|---|---|---|---|
| 7,540,061 B1 * | 6/2009 | Huang .................. | B60S 1/3881 15/250.201 |
| 2007/0174989 A1 | 8/2007 | Moll et al. | |
| 2008/0052865 A1 * | 3/2008 | Chiang .................... | B60S 1/38 15/250.43 |
| 2009/0089956 A1 * | 4/2009 | De Block ............. | B60S 1/3881 15/250.201 |
| 2010/0218333 A1 * | 9/2010 | Ritt ...................... | B60S 1/3877 15/250.201 |

(Continued)

FOREIGN PATENT DOCUMENTS

| | | |
|---|---|---|
| CN | 101868383 | 10/2010 |
| DE | 102004056835 | 6/2006 |

(Continued)

OTHER PUBLICATIONS

International Search Report for Application No. PCT/EP2012/059972 dated Sep. 5, 2012 (2 pages).

*Primary Examiner* — Gary Graham
(74) *Attorney, Agent, or Firm* — Michael Best & Friedrich LLP

(57) ABSTRACT

The invention relates to a wiping device, in particular a wiping device for a motor vehicle pane, comprising a spring element (16a-16g), a retaining unit (10a-10g) that has a retaining element (12a-12g) with a longitudinal guide channel (14a-14g) for guiding the spring element (16a-16g), and comprising a spoiler unit (22a-22g). According to the invention, the spoiler unit (22a-22g) has at least one supporting rib (72a-72g, 74a-74g) that extends from an inner contour of the spoiler (22a-22g) in the form of a projection and that is provided in order to transmit the downforces that occur from the spoiler (22a-22g) to the retaining unit (10a-10g).

12 Claims, 7 Drawing Sheets

(56) References Cited

U.S. PATENT DOCUMENTS

2010/0319154 A1* 12/2010 Bousset ............... B60S 1/3889
                                                    15/250.48
2011/0113581 A1*  5/2011 Boland ................. B60S 1/381
                                                    15/250.31

FOREIGN PATENT DOCUMENTS

| DE | 102007056321 | 11/2009 |
| EP | 1627787 | 2/2006 |
| FR | 2923785 | 5/2009 |
| FR | 2943020 | 9/2010 |
| WO | WO2011/023235 A1 * | 3/2011 |

* cited by examiner

WIPING DEVICE, IN PARTICULAR WIPING DEVICE FOR A MOTOR VEHICLE PANE

BACKGROUND OF THE INVENTION

A wiper device, particularly a motor vehicle windscreen wiper device, having a spring element and a retaining unit, which retaining unit comprises a retaining element with a longitudinal guide channel for guiding the spring element, and having a wind deflector unit is already known in the art.

SUMMARY OF THE INVENTION

The invention is based on a wiper device, particularly a motor vehicle windscreen wiper device, having a spring element and a retaining unit, which retaining unit comprises a retaining element with a longitudinal guide channel for guiding the spring element, and having a wind deflector unit.

It is proposed that the wind deflector unit comprises at least one supporting web, which is provided to transfer contact pressing forces which occur from the wind deflector unit onto the retaining unit, as a result of which the wiper device can be configured in a particularly torsion-resistant manner with a low weight. A "spring element" in this context should be particularly understood to mean a resilient element which has at least one extension, said extension being elastically variable in a normal operating state by at least 10%, particularly by at least 20%, preferably by at least 30% and particularly advantageously by at least 50%, and which particularly generates a counterforce which depends on a change in the extension and is preferably proportional to the change and which counteracts said change. A "retaining unit" in this context should be particularly understood to mean a unit which is provided to connect the wind deflector unit to a wiper strip. A "retaining element" in this context should be particularly understood to mean an element which is provided to connect a wind deflector unit, a spring element and a wiper strip in a form-fitting manner. A "longitudinal guide channel" in this context should be particularly understood to mean a guide channel which extends parallel to a longitudinal direction of the retaining unit. The longitudinal guide channel preferably includes a free space and at least one channel wall delimiting the free space. A "longitudinal direction" in this context should be particularly understood to mean a direction which extends substantially parallel to a longitudinal extension of the retaining element. A "longitudinal extension" in this context should be particularly understood to mean a largest possible extension. "Substantially" in this context should be particularly understood to mean a deviation of less than 10°, preferably less than 5°. An "extension" of an element in this context should be particularly understood to mean a maximum distance between two points on a perpendicular projection of the element on a plane. A "supporting web" in this context should be particularly understood to mean a web which divides a longitudinal channel disposed between the longitudinal guide channel and wind deflector unit into two longitudinal channels and therefore abuts a longitudinal channel on both sides. A "wind deflector unit" in this context should be particularly understood to mean a unit which is provided to deflect a headwind acting on the wiper device and/or to use it to press a wiper strip against a vehicle pane. A "wiper strip" in this context should be particularly understood to mean a strip which is provided to wipe a vehicle windscreen. The wiper strip is preferably made of a rubber material. "Provided" should be particularly understood to mean specially designed and/or equipped. The wind deflector unit preferably comprises at least one concave outer surface.

In a further embodiment it is proposed that the at least one supporting web bears against the retaining element with one free end, as a result of which contact pressing forces which occur can be transferred particularly evenly to the retaining element.

If the at least one supporting web bears against the spring element with one free end, the wiper device can be designed with a particularly low construction height.

It is proposed that the wind deflector unit is produced using a coextrusion process, by virtue of which the wind deflector unit can be produced in a particularly strong and at the same time cost-effective manner. A "coextrusion process" in this context should be particularly understood to mean the combining of at least two plastic melts of different kinds before they leave a profile nozzle.

In addition, it is proposed that the wind deflector unit comprises two wind deflector subcomponents of different hardnesses, as a result of which the weight can be advantageously reduced and strength increased.

Furthermore, it is proposed that the harder wind deflector subcomponent closes the wind deflector unit laterally, as a result of which the softer wind deflector subcomponent can be advantageously protected from damage. "Laterally" within this context should be particularly understood to mean viewed in a wiping direction. "To close" in this context should be particularly understood to mean to cover, surround and/or conceal.

In a further embodiment of the invention, it is proposed that the softer partial wind deflector subcomponent comprises a longitudinal channel which includes a triangular cross-section, as a result of which savings can advantageously be made in terms of material and weight. "Triangular" in this context should be understood to mean a contour which has three corners. The corners may also be rounded, depending on the particular application.

If the softer wind deflector subcomponent and the harder wind deflector subcomponent are connected to one another in a substance-bonded and planar manner on a plane running parallel to a wiping direction, a particularly stable connection can be achieved between the wind deflector subcomponents. A "wiping direction" in this context should be particularly understood to mean a direction which extends parallel to a surface to be wiped and/or perpendicular to a main orientation of the wiper strip.

It is further proposed that the wiper device comprises a retaining unit which has a retaining element having a longitudinal channel for guiding a spring element, wherein the retaining element has at least one fastening element which is provided to link the wind deflector unit in a form-fitting manner in a mounted state, as a result of which a particularly secure assembly of the wind deflector unit can be achieved. A "fastening element" in this context should be particularly understood to mean an element which is provided to create a form fit with a corresponding component. "To link" in this context should be particularly understood to mean to connect and/or attach.

In a main flow region of the wiper device, joints and therefore flow resistance and/or noise can be avoided if the wind deflector unit bears against the retaining element at least partially laterally in the region of the longitudinal guide channel. "Laterally" in this context should be particularly understood to mean coming from a wiping direction.

It is further proposed that the retaining element comprises at least one fastening means which faces the longitudinal channel with one free end and is provided to create a form fit with the wind deflector unit, as a result of which the wiper device can be designed in a particularly stable manner.

BRIEF DESCRIPTION OF THE DRAWINGS

Further advantages emerge from the following drawing description. Seven exemplary embodiments of the invention are depicted in the drawing. The drawings, description and claims contain a plurality of combined features. The person skilled in the art will advantageously observe the features individually too and bring them together to create further appropriate combinations.

In the drawings.

DETAILED DESCRIPTION

Figure 1:
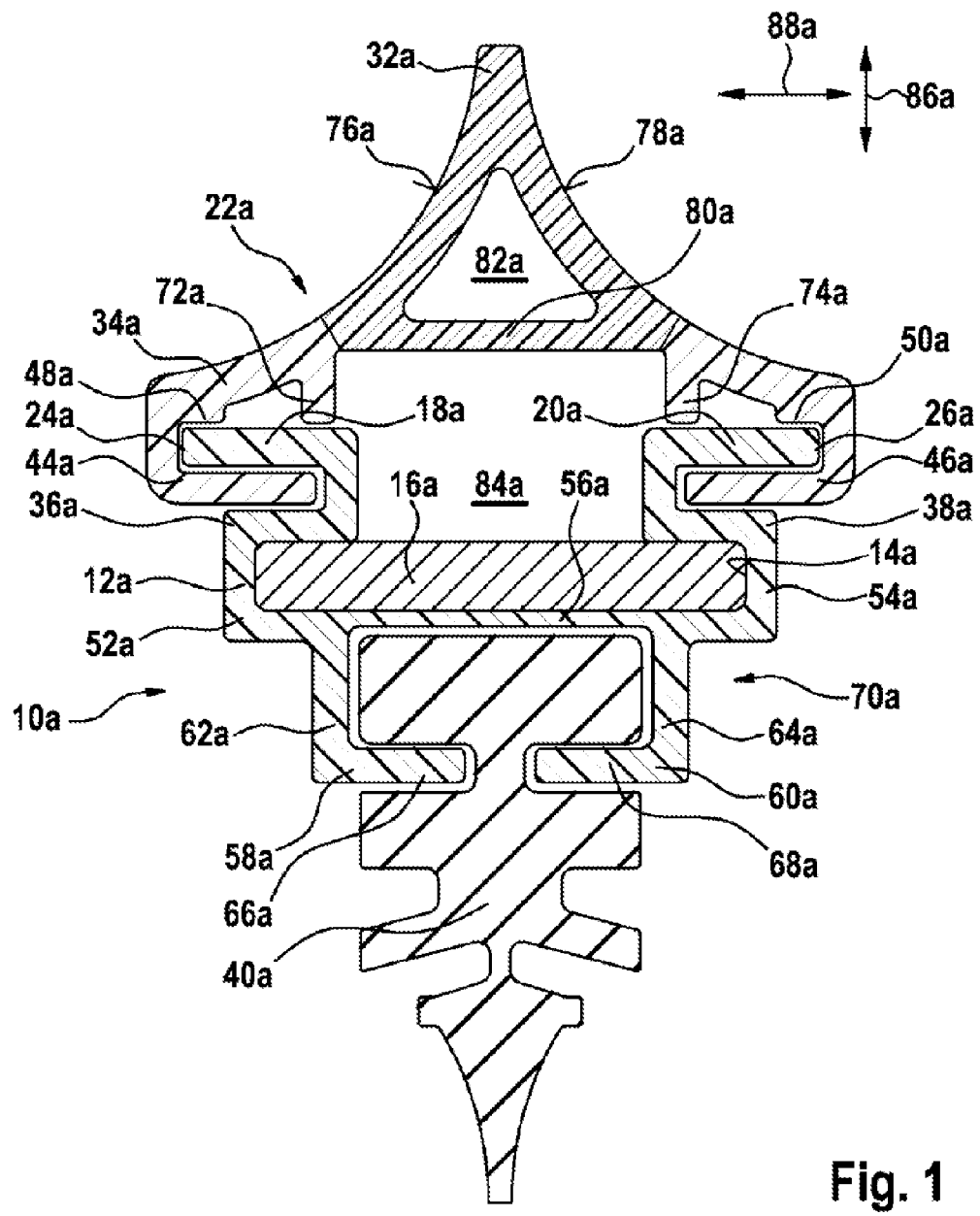
FIG. 1 shows a sectional view of a wiper device with a retaining unit.

FIG. 1 shows a wiper device according to the invention having a retaining unit 10a with a retaining element 12a which has a longitudinal guide channel 14a for guiding a spring element 16a, as a sectional view. The sectional plane extends perpendicularly to a longitudinal direction of the retaining element 12a.

The retaining element 12a comprises two fastening elements 18a, 20a. The fastening elements 18a, 20a are formed integrally with the retaining element 12a. The fastening elements 18a, 20a point at their free ends 24a, 26a in directions facing away from one another, which extend parallel to a wiping direction 88a. In addition, the fastening elements 18a, 20a extend in an L-shape from channel walls 36a, 38a which abut the longitudinal guide channel 14a. A space between the free ends 24a, 26a is greater than a width of the longitudinal guide channel 14a. The fastening elements 18a, 20a are provided to link a wind deflector unit 22a in a mounted state in a form-fitting manner. The free ends 24a, 26a of the fastening elements 18a, 20a are surrounded by the wind deflector unit 22a for this purpose. The wind deflector unit 22a comprises two L-shaped fastening means 44a, 46a and also supporting bodies 48a, 50a abutting the fastening means 44a, 46a.

To guide the spring element 16a, side walls 52a, 54a of the longitudinal guide channel 14a bear against the channel walls 36a, 38a. The channel walls 36a, 38a thereby enclose a right angle with the side walls 52a, 54a. In addition, a partition wall 56a is arranged at the side walls 52a, 54a, which closes the longitudinal guide channel 14a in the direction of a wiper strip 40a. The side walls 52a, 54a extend from the partition wall 56a in a direction facing away from the wiper strip 40a. The retaining element 12a has a longitudinal opening 84a, which opens the longitudinal guide channel 14a towards the wind deflector unit 22a.

Two L-shaped guide profiles 58a, 60a of the retaining unit 10a are arranged on the partition wall 56a. The guide profiles 58a, 60a are formed integrally with the retaining element 12a. The guide profiles 58a, 60a each have a lateral guide 62a, 64a and a vertical guide 66a, 68a. The vertical guides 66a, 68a each enclose an angle of 90° with the lateral guides 62a, 64a. The vertical guides 66a, 68a point to one another in this case. The lateral guides 62a, 64a each enclose an angle of 90° relative to the partition wall 56a. The guide profiles 58a, 60a point at their free ends of the vertical guides 66a, 68a in directions facing one another. The guide profiles 58a, 60a and the partition wall 56a form a welt track 70a, into which the wiper strip 40a is inserted.

The retaining element 12a is produced integrally from polyethylene by an extrusion process. A person skilled in the art will consider different plastics which seem appropriate in this context, such as polypropylene, polyamide, polyvinyl chloride and/or polystyrene in particular.

The wind deflector unit 22a is produced from two wind deflector subcomponents 32a, 34a of different hardnesses using a coextrusion process. The first wind deflector subcomponent 32a comprises two outwardly concave wind deflector sides 76a, 78a. To reinforce the wind deflector unit 22a, the first wind deflector subcomponent 32a has a connecting web 80a, which connects the concave wind deflector sides 76a, 78a to one another. The connecting web 80a and the wind deflector sides 76a, 78a enclose a longitudinal channel 82a which includes a triangular cross-section.

The first wind deflector subcomponent 32a is configured integrally with the second wind deflector subcomponent 34a and is provided to deflect headwind. The second wind deflector subcomponent 34a exhibits a greater strength and hardness than the first wind deflector subcomponent 32a. The L-shaped fastening means 44a, 46a and also the supporting bodies 48a, 50a abutting the fastening means 44a, 46a are integrally formed on the second wind deflector subcomponent 34a. The harder wind deflector subcomponent 34a surrounds the fastening elements 18a, 20a and thereby closes the retaining unit 10a laterally.

The second wind deflector subcomponent 34a further exhibits two supporting webs 72a, 74a. The supporting webs 72a, 74a bear against the fastening elements 18a, 20a of the retaining element 12a with their free ends on a side facing away from the wiper strip 40a. The supporting webs 72a, 74a are provided for the transfer of contact pressing forces which arise at the wind deflector unit 22a when a headwind is encountered. The supporting webs 72a, 74a extend over the entire length of the wind deflector unit 22a.

The spring element 16a is inserted into the longitudinal guide channel 14a. The spring element 16a is produced from spring steel and provided to form the retaining unit 10a in an elastically deflecting manner.

For assembly, the spring element 16a is initially introduced into the longitudinal guide channel 14a. The wiper strip 40a is then inserted into the welt track 70a and creates a form fit with the retaining element 12a. The wind deflector unit 22a is pushed via the fastening elements 18a, 20a and is then connected thereto in a form-fitting manner.

Six further exemplary embodiments of the invention are shown in FIGS. 2 to 7. The following descriptions are essentially limited to the differences between the exemplary embodiments, wherein reference can be made to the description of the first exemplary embodiment in relation to those components, features and functions which remain the same. To distinguish between the exemplary embodiments, the letter a in the reference numbers of the exemplary embodiment in FIG. 1 is replaced by the letters b to g in the reference numbers of the exemplary embodiments in FIGS. 2 to 7. In relation to those components which remain the same, particularly in relation to components with the same reference numbers, reference can be made in principle to the drawings and/or the description of the exemplary embodiment.

Figure 2:
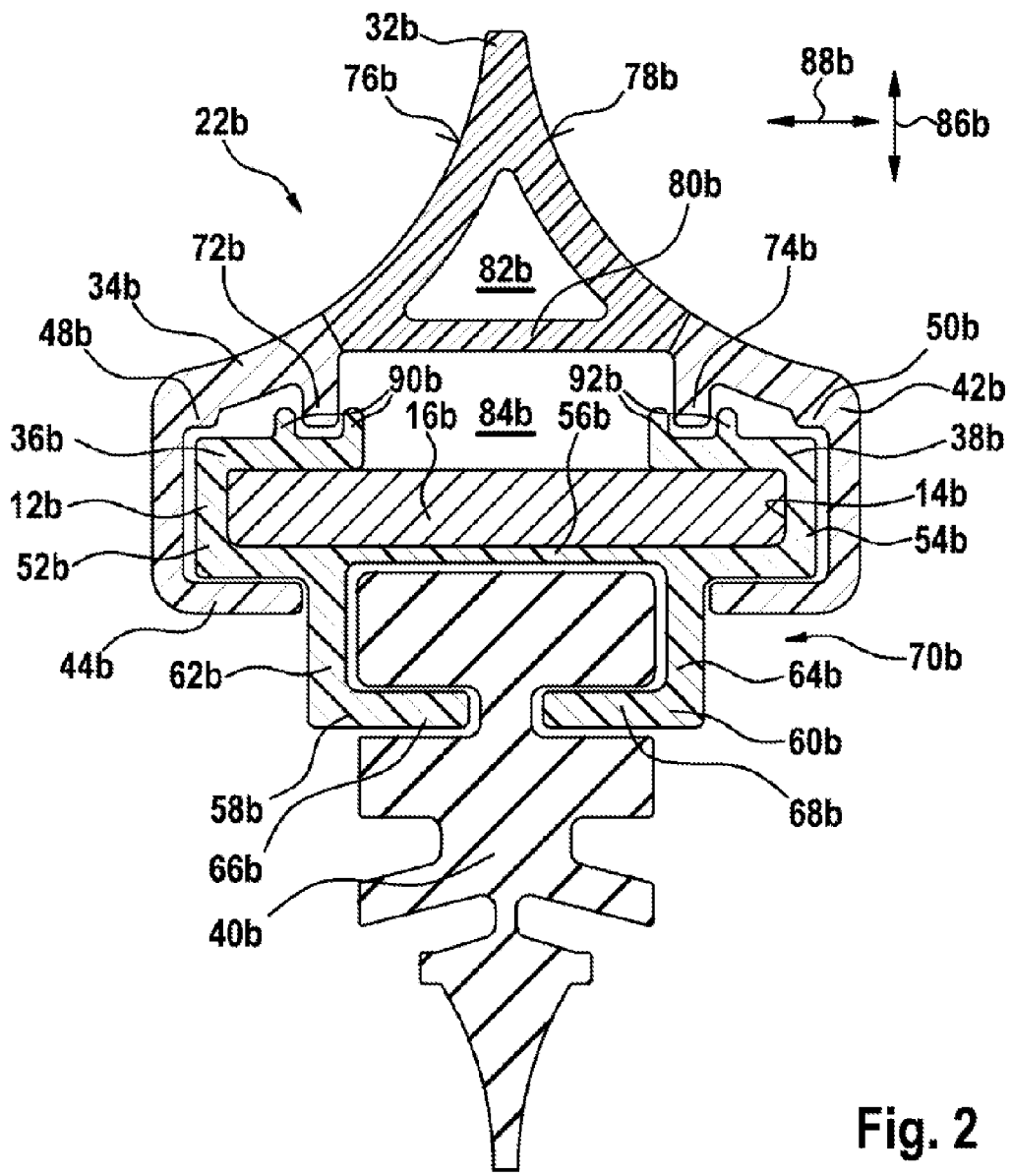
FIG. 2 shows a sectional view of a further exemplary embodiment of a wiper device with a retaining unit.

FIG. 2 shows a further exemplary embodiment of a wiper device according to the invention having a retaining unit 10b with a retaining element 12b which has a longitudinal guiding channel 14b for guiding a spring element 16b, as well as a wind deflector unit 22b, as a sectional view. The sectional plane extends perpendicularly to a longitudinal direction of the retaining element 12b.

The retaining unit 10b comprises channel walls 36b, 38b which are configured integrally with the retaining element 12b. The channel walls 36b, 38b abut the longitudinal guide channel 14b on a side facing away from the wiper strip. On the channel walls 36b, 38b, two longitudinal prolongations 90b, 92b are arranged on each side facing away from the wiper strip. The wind deflector unit 22b exhibits two L-shaped fastening means 44b, 46b and also supporting bodies 48b, 50b abutting the fastening means 44b, 46b.

To guide the spring element 16b, side walls 52b, 54b of the longitudinal guide channel 14b bear against the channel walls 36b, 38b. The channel walls 36b, 38b thereby enclose a right angle with the side walls 52b, 54b. In addition, a partition wall 56b is arranged at the side walls 52b, 54b, which closes the longitudinal guide channel 14b in the direction of a wiper strip 40b. The side walls 52b, 54b extend from the partition wall 56b in a direction facing away from the wiper strip 40b. The retaining element 12b has a longitudinal opening 84b, which opens the longitudinal guide channel 14b towards the wind deflector unit 22b.

Two L-shaped guide profiles 58b, 60b of the retaining unit 10b are arranged on the partition wall 56b. The guide profiles 58b, 60b are formed integrally with the retaining element 12b. The guide profiles 58b, 60b each have a lateral guide 62b, 64b and a vertical guide 66b, 68b. The vertical guides 66b, 68b each enclose an angle of 90° with the lateral guides 62b, 64b. The vertical guides 66b, 68b in this case point towards one another. The lateral guides 62b, 64b each enclose an angle of 90° to the partition wall 56b. The guide profiles 58b, 60b point at their free ends of the vertical guides 66b, 68b in directions facing one another. The guide profiles 58b, 60b and the partition wall 56b form a welt track 70b into which the wiper strip 40b is inserted.

The retaining element 12b is integrally produced from polyethylene by an extrusion process. A person skilled in the art will consider different plastics which seem appropriate in this context, such as polypropylene, polyamide, polyvinyl chloride and/or polystyrene in particular.

The wind deflector unit 22b is produced from two wind deflector subcomponents 32b, 34b, 42b of different hardnesses. The first wind deflector subcomponent 32b comprises two wind deflector sides 76b, 78b configured in an outwardly concave manner. To strengthen the wind deflector unit 22b, the first wind deflector subcomponent 32b has a connecting web 80b, which connects the concave wind deflector sides 76b, 78b to one another. The connecting web 80b and the wind deflector sides 76b, 78b enclose a longitudinal channel 82b which includes a triangular cross-section.

The first wind deflector subcomponent 32b is configured integrally with the second wind deflector subcomponent 34b, 42b and provided to deflect headwind. The second wind deflector subcomponent 34b, 42b has a greater strength and hardness than the first wind deflector subcomponent 32b. The L-shaped fastening means 44b, 46b and also the supporting bodies 48b, 50b abutting the fastening means 44b, 46b are integrally formed on the second wind deflector subcomponent 34b, 42b. The harder wind deflector subcomponent 34b, 42b surrounds the retaining element 12b in the region of the longitudinal guide channel 14b.

The second wind deflector subcomponent 34b, 42b also has two supporting webs 72b, 74b. The supporting webs 72b, 74b bear against the channel walls 36b, 38b with their free ends on a side facing away from the wiper strip 40b. The supporting webs 72b, 74b are provided to transfer contact pressing forces which arise at the wind deflector unit 22b when a headwind is encountered. The supporting webs 72b, 74b extend over the entire length of the wind deflector unit 22b. The longitudinal prolongations 90b, 92b each partially surround the supporting webs 72b, 74b in a wiping direction 88b.

The spring element 16b is inserted into the longitudinal guide channel 14b. The spring element 16b is produced from spring steel and provided to form the retaining unit 10b in an elastically deflecting manner.

For assembly, the spring element 16b is initially introduced into the longitudinal guide channel 14b. The wiper strip 40b is then inserted into the welt track 70b and creates a form fit with the retaining element 12b. The wind deflector unit 22b is pushed via the retaining elements 12b and is then connected thereto in a form-fitting manner.

Figure 3:
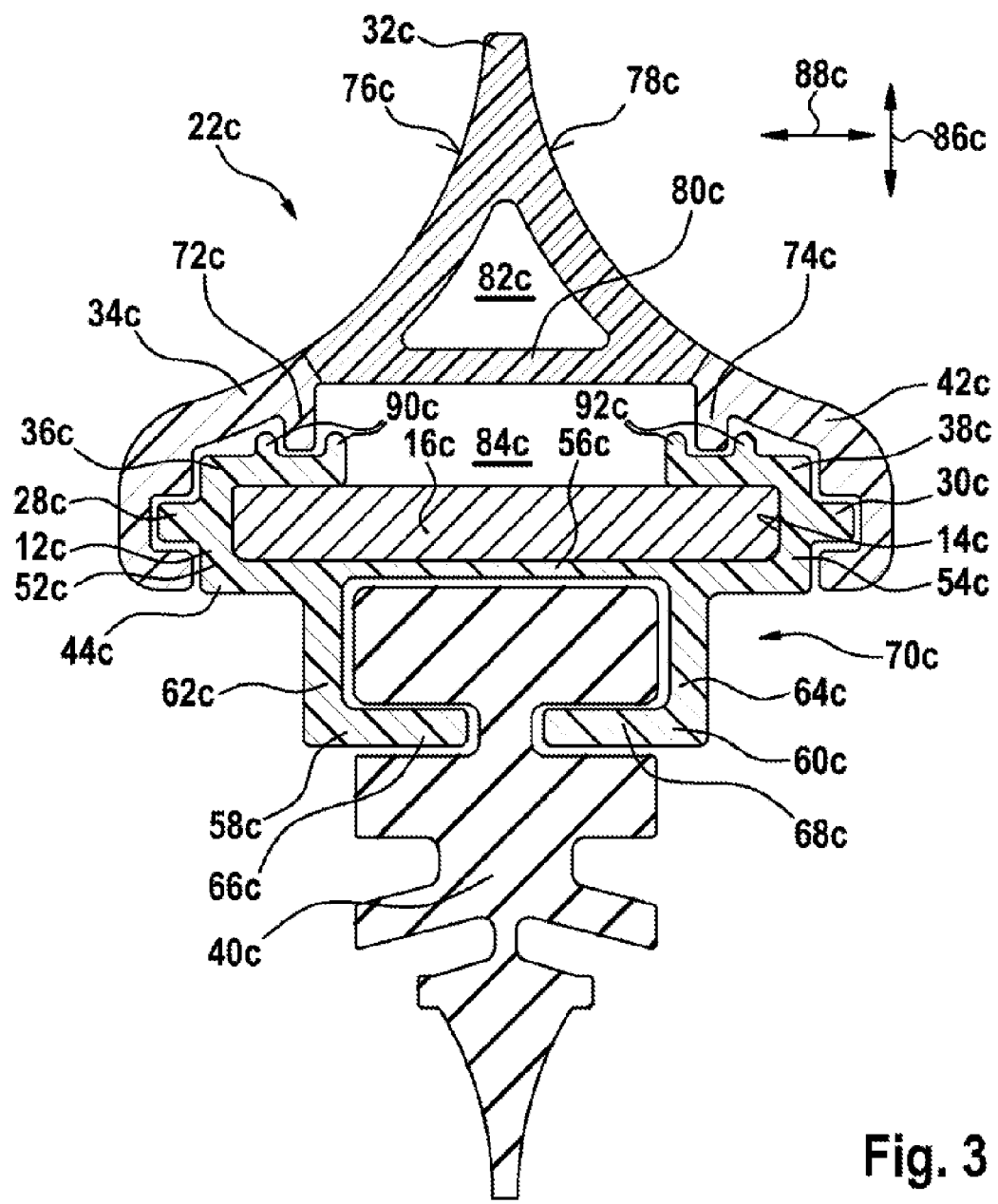
FIG. 3 shows a sectional view of a further exemplary embodiment of a wiper device with a retaining unit.

FIG. 3 shows a further exemplary embodiment of a wiper device according to the invention having a retaining unit 10c with a retaining element 12c which has a longitudinal guide channel 14c for guiding a spring element 16c, as a sectional view. The sectional plane extends perpendicularly to a longitudinal direction of the retaining element 12c. The wiper device shown substantially corresponds to the exemplary embodiment shown in FIG. 2.

A side strip 28c, 30c is integrally formed on the retaining element 12c in the region of the longitudinal guide channel 14c on each side pointing in one wiping direction 88c. The side strips 28c, 30c create a form fit with a wind deflector unit 22c in the mounted state. The form fit prevents the wind deflector unit 22c from moving in a vertical direction 86c relative to the retaining element 12c. The vertical direction 86c extends perpendicularly to the longitudinal direction and perpendicularly to the wiping direction 88c.

Figure 4:
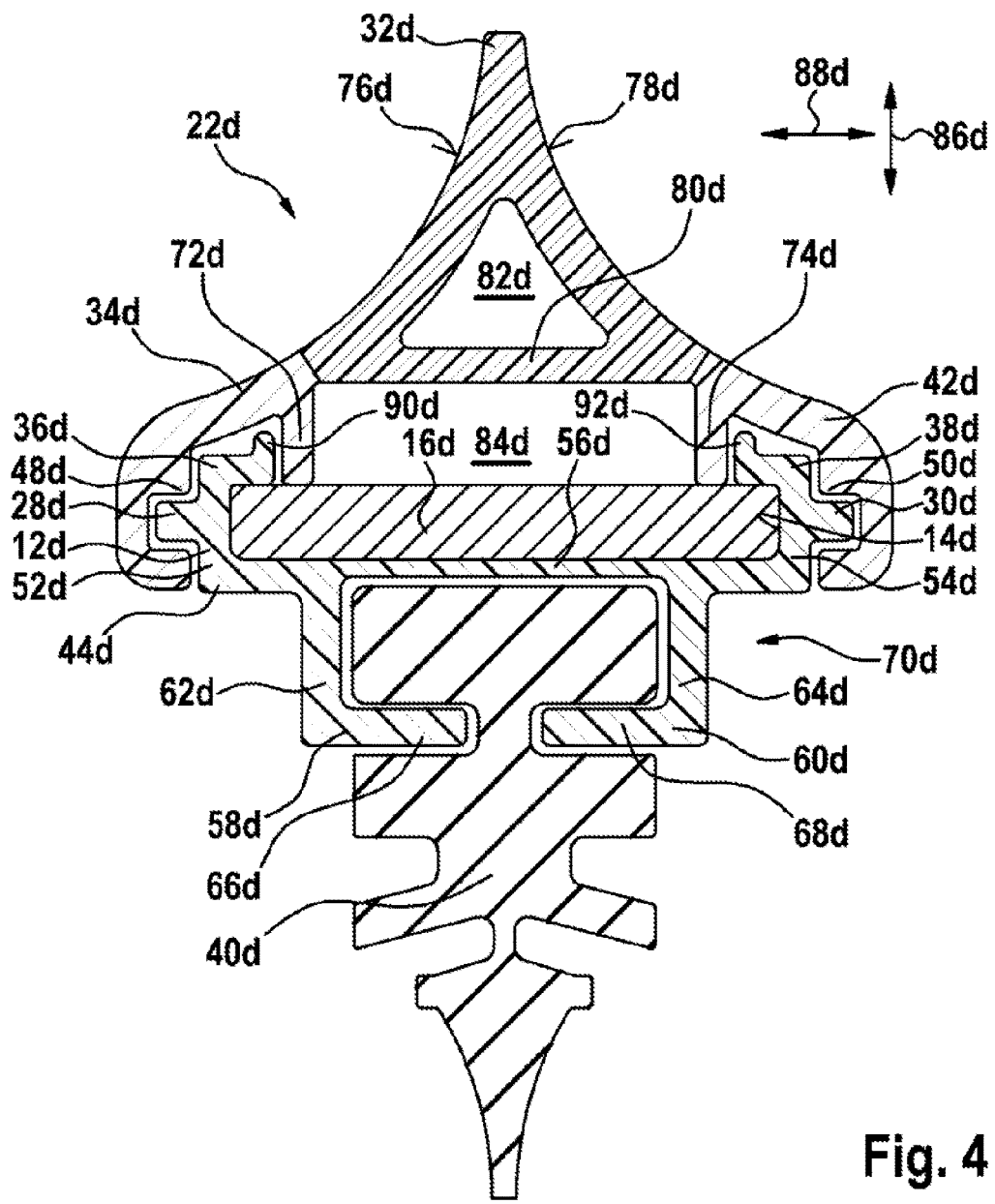
FIG. 4 shows a sectional view of a further exemplary embodiment of a wiper device with a retaining unit.

FIG. 4 shows a further exemplary embodiment of a wiper device according to the invention having a retaining unit 10d with a retaining element 12d which has a longitudinal guide channel 14d for guiding a spring element 16d, as a sectional view. The sectional plane extends perpendicularly to a longitudinal direction of the retaining element 12d. The wiper device shown substantially corresponds to the exemplary embodiment shown in FIG. 3.

The retaining unit 10d has channel walls 36d, 38d which are configured integrally with the retaining element 12d. The channel walls 36d, 38d abut the longitudinal guide channel 14d on a side facing away from the wiper strip. One longitudinal prolongation 90d, 92d is arranged on each of the channel walls 36d, 38d on a side facing away from the wiper strip.

A side strip 28d, 30d is integrally formed on the retaining element 12d in the region of the longitudinal guide channel 14d on each side pointing in one wiping direction 88d. The side strips 28d, 30d create a form fit with a wind deflector unit 22d in the mounted state. The form fit prevents the wind deflector unit 22d from moving in a vertical direction 86d relative to the retaining element 12d. The vertical direction 86d extends perpendicularly to the longitudinal direction and perpendicularly to the wiping direction 88d.

The wind deflector unit 22d is produced using a coextrusion process from two wind deflector subcomponents 32d, 34d, 42d with different hardnesses. The first wind deflector subcomponent 32d has two wind deflector sides 76d, 78d configured in an outwardly concave manner. To strengthen the wind deflector unit 22d, the first wind deflector subcomponent 32d has a connecting web 80d which connects the concave wind deflector sides 76d, 78d to one another. The connecting web 80d and the wind deflector sides 76d, 78d enclose a longitudinal channel 82d which includes a triangular cross-section.

The first wind deflector subcomponent 32d is integrally configured with the second wind deflector subcomponent 34d, 42d and is provided to deflect headwind. The second wind deflector subcomponent 34d, 42d exhibits a greater strength and hardness than the first wind deflector subcomponent 32d. L-shaped fastening means 44d, 46d are integrally formed on the second wind deflector subcomponent 34d, 42d and also on supporting bodies 48d, 50d abutting the fastening means 44d, 46d. The harder wind deflector subcomponent 34d, 42d surrounds the retaining element 12d in the region of the longitudinal guide channel 14d.

The second wind deflector subcomponent 34d, 42d also has two supporting webs 72d, 74d. The supporting webs 72d, 74d bear against the spring element 16d at their free ends on a side facing away from the wiper strip 40d. The supporting webs 72d, 74d are provided to transfer contact pressing forces to the spring element 16d which occur at the wind deflector unit 22d when a headwind is encountered. The supporting webs 72d, 74d extend over the entire length of the wind deflector unit 22d. The longitudinal prolongations 90d, 92d bear against the supporting webs 72d, 74d partially in a wiping direction 88d in each case.

Figure 5:
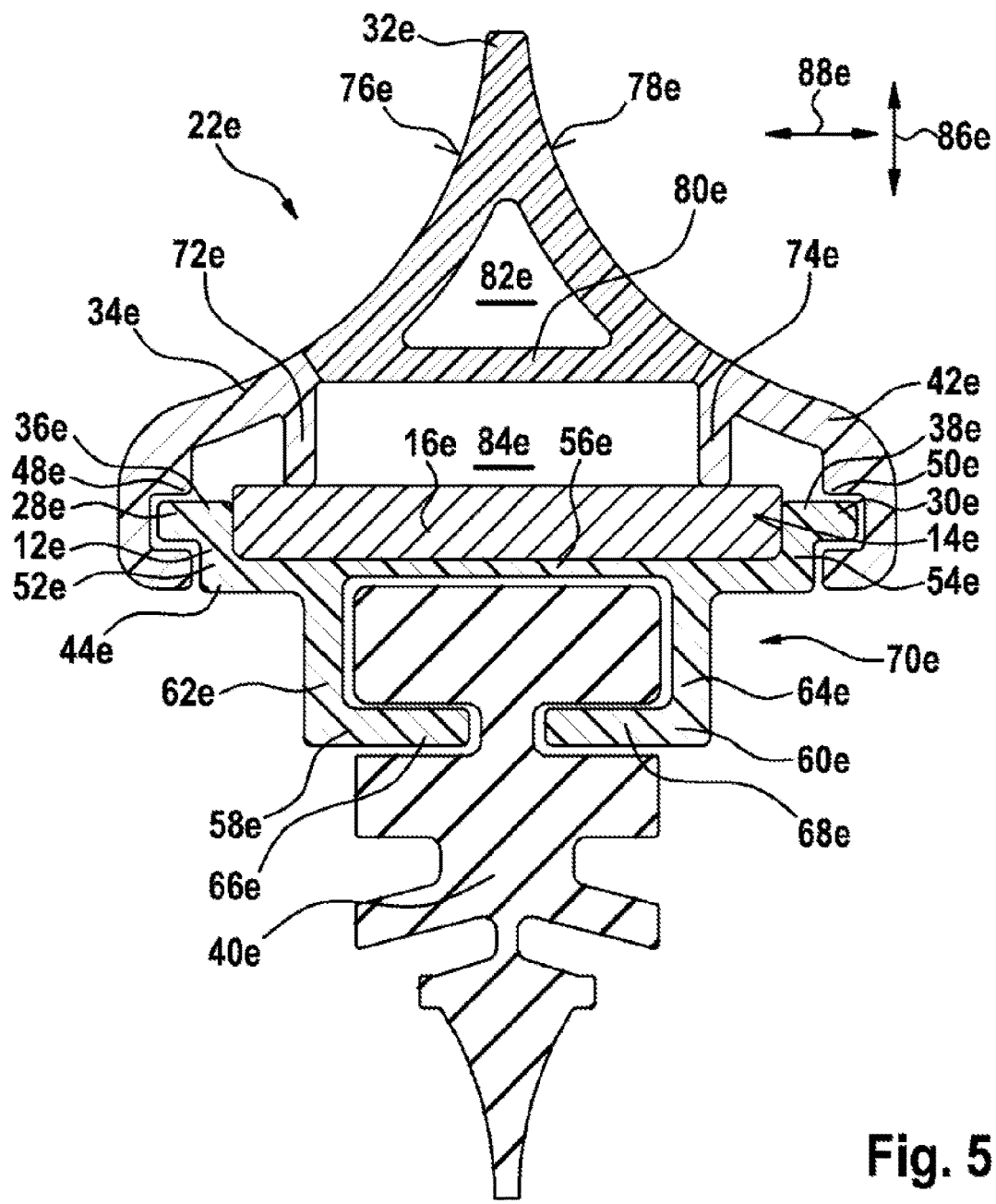
FIG. 5 shows a sectional view of a further exemplary embodiment of a wiper device with a retaining unit.

FIG. 5 shows a further exemplary embodiment of a wiper device according to the invention having a retaining unit 10e with a retaining element 12e which has a longitudinal guide channel 14e for guiding a spring element 16e, as well as a wind deflector unit 22e, as a sectional view. The sectional plane extends perpendicularly to a longitudinal direction of the retaining element 12e.

The longitudinal guide channel 14e is trough-shaped in design. The longitudinal guide channel 14e is open over the entire width and length in the direction of the wind deflector unit 22e.

To guide the spring element 16e, the longitudinal guide channel 14e has side walls 52e, 54e. In addition, a partition wall 56e is arranged at the side walls 52e, 54e, which closes the longitudinal guide channel 14e in the direction of a wiper strip 40e. The side walls 52e, 54e extend from the partition wall 56e in a direction facing away from the wiper strip 40e. The retaining element 12e has a longitudinal opening 84e which completely opens the longitudinal guide channel 14e towards the wind deflector unit 22e.

A side strip 28e, 30e is integrally formed on the retaining element 12e in the region of the longitudinal guide channel 14e on each side pointing in one wiping direction 88e. The side strips 28e, 30e create a form fit with a wind deflector unit 22e in the mounted state. The form fit prevents the wind deflector unit 22e from moving in a vertical direction 86e relative to the retaining element 12e. The vertical direction 86e extends perpendicularly to the longitudinal direction and perpendicularly to the wiping direction 88e.

Two L-shaped guide profiles 58e, 60e of the retaining unit 10e are arranged on the partition wall 56e. The guide profiles 58e, 60e are formed integrally with the retaining element 12e. The guide profiles 58e, 60e each have a lateral guide 62e, 64e and a vertical guide 66e, 68e. The vertical guides 66e, 68e each enclose an angle of 90° with the lateral guides 62e, 64e. The vertical guides 66e, 68e point to one another in this case. The lateral guides 62e, 64e each enclose an angle of 90° relative to the partition wall 56e. The guide profiles 58e, 60e point at their free ends of the vertical guides 66e, 68e in directions facing one another. The guide profiles 58e, 60e and the partition wall 56e form a welt track 70e, into which the wiper strip 40e is inserted.

The retaining element 12e is produced integrally from polyethylene by an extrusion process. A person skilled in the art will consider different plastics which seem appropriate in this context, such as polypropylene, polyamide, polyvinyl chloride and/or polystyrene in particular.

The wind deflector unit 22e is produced from two wind deflector subcomponents 32e, 34e, 42e of different hardnesses using a coextrusion process. The first wind deflector subcomponent 32a comprises two outwardly concave wind deflector sides 76e, 78e. To reinforce the wind deflector unit 22e, the first wind deflector subcomponent 32a has a connecting web 80e, which connects the concave wind deflector sides 76e, 78e to one another. The connecting web 80e and the wind deflector sides 76e, 78e enclose a longitudinal channel 82e which includes a triangular cross-section.

The first wind deflector subcomponent 32e is configured integrally with the second wind deflector subcomponent 34e, 42e and is provided to deflect headwind. The second wind deflector subcomponent 34e, 42e exhibits a greater strength and hardness than the first wind deflector subcomponent 32e. The L-shaped fastening means 44e, 46e and also the supporting bodies 48e, 50e abutting the fastening means 44e, 46e are integrally formed on the second wind deflector subcomponent 34e, 42e. The harder wind deflector subcomponent 34e, 42e surrounds the retaining element 12e in the region of the longitudinal guide channel 14e.

The second wind deflector subcomponent 34e, 42e also has two supporting webs 72e, 74e. The supporting webs 72e, 74e bear against the spring element 16e with their free ends on a side facing away from the wiper strip 40e. The supporting webs 72e, 74e are provided for the transfer of contact pressing forces which arise at the wind deflector unit 22e when a headwind is encountered. The supporting webs 72e, 74e extend over the entire length of the wind deflector unit 22e. The supporting webs 72e, 74e prevent the spring element 16e from moving in the vertical direction 86e. The vertical direction 86e extends perpendicularly to the longitudinal direction and perpendicularly to the wiping direction 88e.

The spring element 16e is inserted into the longitudinal guide channel 14e. The spring element 16e is produced from spring steel and provided to form the retaining unit 10e in an elastically deflecting manner.

For assembly, the spring element 16e is initially introduced into the longitudinal guide channel 14e. The wiper strip 40e is then inserted into the welt track 70e and creates a form fit with the retaining element 12e. The wind deflector unit 22e is pushed via the retaining element 12e and then connected thereto in a form-fitting manner.

Figure 6:
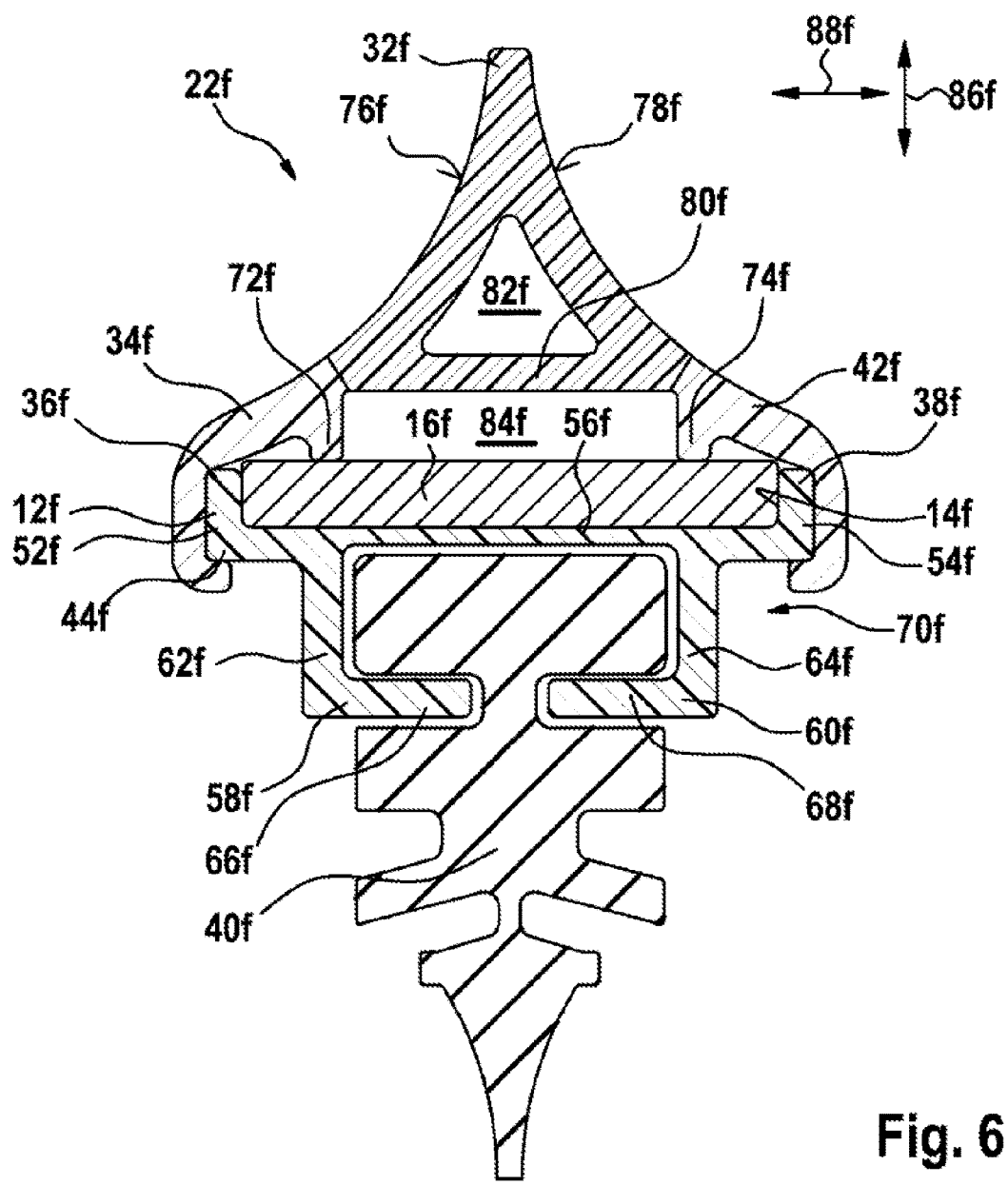
FIG. 6 shows a sectional view of a further exemplary embodiment of a wiper device with a retaining unit.

FIG. 6 shows a further exemplary embodiment of a wiper device according to the invention having a retaining unit 10f with a retaining element 12f which has a longitudinal guide channel 14f for guiding a spring element 16f and a wind deflector unit 22f, as a sectional view. The sectional plane extends perpendicularly to a longitudinal direction of the retaining element 12f.

The longitudinal guide channel 14f is trough-shaped in design. The longitudinal guide channel 14f is opened in the direction of the wind deflector unit 22f over the entire width and length.

The longitudinal guide channel 14f has side walls 52f, 54f to guide the spring element 16f. In addition, a partition wall 56f is arranged at the side walls 52f, 54f, which closes the longitudinal guide channel 14f in the direction of a wiper strip 40f. The side walls 52f, 54f extend from the partition wall 56f in a direction facing away from the wiper strip 40f. The retaining element 12f has a longitudinal opening 84f, which completely opens the longitudinal guide channel 14f to the wind deflector unit 22f.

Two L-shaped guide profiles 58f, 60f of the retaining unit 10f are arranged on the partition wall 56f. The guide profiles 58f, 60f are formed integrally with the retaining element 12f. The guide profiles 58f, 60f each have a lateral guide 62f, 64f and a vertical guide 66f, 68f. The vertical guides 66f, 68f each enclose an angle of 90° with the lateral guides 62f, 64f. The vertical guides 66f, 68f point to one another in this case. The lateral guides 62f, 64f each enclose an angle of 90° relative to the partition wall 56f. The guide profiles 58f, 60f point at their free ends of the vertical guides 66f, 68f in directions facing one another. The guide profiles 58f, 60f and the partition wall 56f form a welt track 70f, into which the wiper strip 40f is inserted.

The retaining element 12f is produced integrally from polyethylene by an extrusion process. A person skilled in the art will consider different plastics which seem appropriate in this context, such as polypropylene, polyamide, polyvinyl chloride and/or polystyrene in particular.

The wind deflector unit 22f is produced from two wind deflector subcomponents 32f, 34f, 42f of different hardnesses using a coextrusion process. The first wind deflector subcomponent 32f comprises two outwardly concave wind deflector sides 76f, 78f. To reinforce the wind deflector unit 22f, the first wind deflector subcomponent 32f has a connecting web 80f, which connects the concave wind deflector sides 76f, 78f to one another. The connecting web 80f and the wind deflector sides 76f, 78f enclose a longitudinal channel 82f, which includes a triangular cross-section.

The first wind deflector subcomponent 32f is configured integrally with the second wind deflector subcomponent 34f, 42f and is provided to deflect headwind. The second wind deflector subcomponent 34f, 42f exhibits a greater strength and hardness than the first wind deflector subcomponent 32f. L-shaped fastening means 44f, 46f are integrally formed on the second wind deflector subcomponent 34f, 42f. The harder wind deflector subcomponent 34f, 42f surrounds the retaining element 12f in the region of the longitudinal guide channel 14f.

The second wind deflector subcomponent 34f, 42f also has two supporting webs 72f, 74f. The supporting webs 72f, 74f bear against the spring element 16f with their free ends on a side facing away from the wiper strip 40f. The supporting webs 72f, 74f are provided for the transfer of contact pressing forces which arise at the wind deflector unit 22f when a headwind is encountered. The supporting webs 72f, 74f extend over the entire length of the wind deflector unit 22f. The supporting webs 72f, 74f prevent the spring element 16f from moving in a vertical direction 86f. The vertical direction 86f extends perpendicularly to the longitudinal direction and perpendicularly to a wiping direction 88f.

The spring element 16f is inserted into the longitudinal guide channel 14f. The spring element 16f is produced from spring steel and provided to form the retaining unit 10f in an elastically deflecting manner.

For assembly, the spring element 16f is initially introduced into the longitudinal guide channel 14f. The wiper strip 40f is then inserted into the welt track 70f and creates a form fit with the retaining element 12f. The wind deflector unit 22f is pushed via the retaining element 12f and is then connected thereto in a form-fitting manner.

Figure 7:
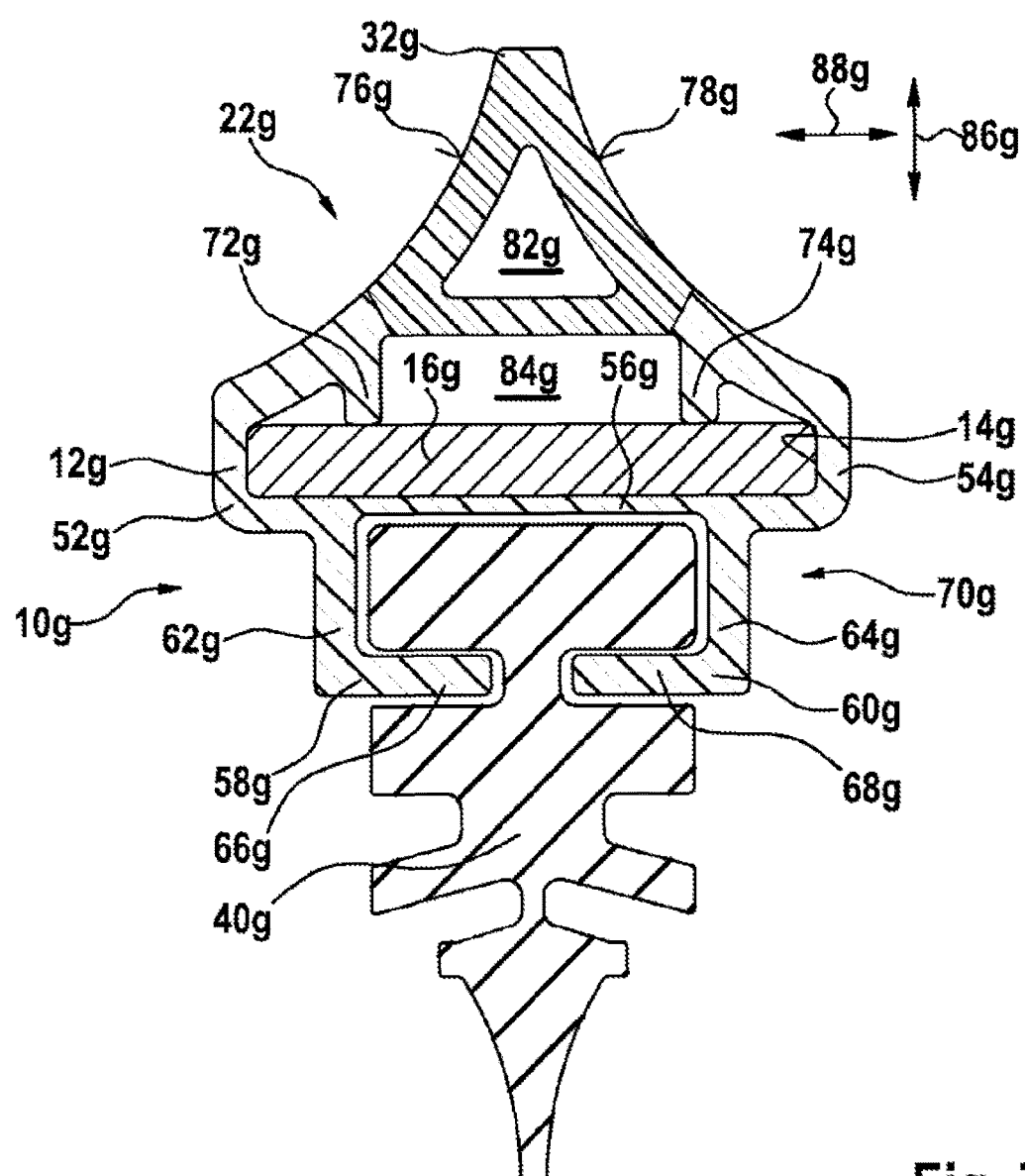
FIG. 7 shows a sectional view of a further exemplary embodiment of a wiper device with a retaining unit.

FIG. 7 shows a further exemplary embodiment of a wiper device according to the invention having a retaining unit 10g with a retaining element 12g which has a longitudinal guide channel 14g for guiding a spring element 16g, as well as a wind deflector unit 22g, as a sectional view. The sectional plane runs perpendicularly to a longitudinal direction of the retaining element 12g.

The longitudinal guide channel 14g is trough-shaped in design. The longitudinal guide channel 14g is open over the entire width and length in the direction of the wind deflector unit 22g.

To guide the spring element 16g, the longitudinal guide channel 14g has side walls 52g, 54g. In addition, a partition wall 56g is arranged at the side walls 52g, 54g, which closes the longitudinal guide channel 14g in the direction of a wiper strip 40g. The side walls 52g, 54g extend from the partition wall 56g in a direction facing away from the wiper strip 40g. The retaining element 12g has a longitudinal opening 84g, which opens the longitudinal guide channel 14g towards the wind deflector unit 22g.

Two L-shaped guide profiles 58g, 60g of the retaining element 10g are arranged on the partition wall 56g. The guide profiles 58g, 60g are formed integrally with the retaining element 12g. The guide profiles 58g, 60g each have a lateral guide 62g, 64g and a vertical guide 66g, 68g. The vertical guides 66g, 68g each enclose an angle of 90° with the lateral guides 62g, 64g. The vertical guides 66g, 68g point to one another in this case. The lateral guides 62g, 64g each enclose an angle of 90° relative to the partition wall 56g. The guide profiles 58g, 60g point at their free ends of the vertical guides 66g, 68g in directions facing one another. The guide profiles 58g, 60g and the partition wall 56g form a welt track 70g, into which the wiper strip 40g is inserted.

The wind deflector unit 22g is produced from two wind deflector subcomponents 32g, 34g of different hardnesses using a coextrusion process. The first wind deflector subcomponent 32g comprises two outwardly concave wind deflector sides 76g, 78g. To reinforce the wind deflector unit 22g, the first wind deflector subcomponent 32g has a connecting web 80g, which connects the concave wind deflector sides 76g, 78g to one another. The connecting web 80g and the wind deflector sides 76g, 78g enclose a longitudinal channel 82g which includes a triangular cross-section.

The first wind deflector subcomponent 32g is configured integrally with the second wind deflector subcomponent 34g and is provided to deflect headwind. The second wind deflector subcomponent 34g exhibits a greater strength and hardness than the first wind deflector subcomponent 32g. The second wind deflector subcomponent 34g is integrally formed with the retaining element 12g and produced from a plastic. A person skilled in the art will consider different plastics which seem appropriate in this context, such as polypropylene, polyamide, polyvinyl chloride and/or polystyrene in particular.

The second wind deflector subcomponent 34g further exhibits two supporting webs 72g, 74g. The supporting webs 72g, 74g bear against the spring element 16g with their free ends on a side facing away from the wiper strip 40g. The supporting webs 72g, 74g are provided for the transfer of contact pressing forces which arise at the wind deflector unit 22g when a headwind is encountered. The supporting webs 72g, 74g extend over the entire length of the wind deflector unit 22g. The supporting webs 72g, 74g prevent the spring element 16g from moving in a vertical direction 86g. The vertical direction 86g extends perpendicularly to the longitudinal direction and perpendicularly to the wiping direction 88g.

The spring element 16g is inserted into the longitudinal guide channel 14g. The spring element 16g is produced from spring steel and provided to form the retaining unit 10g in an elastically deflecting manner.

For assembly, the spring element 16g is introduced into the longitudinal guide channel 14g. The wiper strip 40g is then inserted into the welt track 70g and creates a form fit with the retaining element 12g.

What is claimed is:

1. A wiper device, comprising a spring element (16a-16g) and a retaining unit (10a-10g), which retaining unit comprises a retaining element (12a-12g) with a longitudinal guide channel (14a-14g) guiding the spring element (16a-16g), the retaining element (12a-12g) further including two channel walls (36a-36d, 38a-38d) wrapped around sides of the spring element (16a-16g), wherein each channel wall (36a-36d, 38a-38d) includes a first portion that extends over and contacts a top of the spring element (16a-16g), a second portion that extends along and contacts a side of the spring element (16a-16g), and a third portion that extends under and contacts a bottom of the spring element (16a-16g), and the wiper device comprising a wind deflector unit (22a-22g) including two supporting webs (72a-72g, 74a-74g) extending by prolongations from an inner contour of the wind deflector unit (22a-22g), which supporting webs transfer contact pressing forces which occur from the wind deflector unit (22a-22g) directly onto either the first portions of the channel walls (36a-36d, 38a-38d) or directly onto the spring element (16a-16g), wherein a further channel is disposed between the longitudinal guide channel (14a-14g) and the wind deflector unit (22a-22g), and wherein the two supporting webs (72a-72g, 74a-74g) divide the further channel into three separate longitudinal channels above the retaining element (12a-12g).

2. The wiper device as claimed in claim 1, characterized in that the wind deflector unit (22a-22g) is produced using a coextrusion process.

3. The wiper device as claimed in claim 2, characterized in that the wind deflector unit (22a-22g) comprises two wind deflector subcomponents (32a-32g,34a-34g) of different hardnesses.

4. The wiper device as claimed in claim 3, characterized in that a harder wind deflector subcomponent (34a-34g) closes the wind deflector unit (22a-22g) laterally.

5. The wiper device as claimed in claim 4, characterized in that the retaining element (12a-12g) has a longitudinal opening (84a-84g), which opens the longitudinal guide channel (14a-14g) towards the wind deflector unit (22a-22g) at least partially.

6. The wiper device as claimed in claim 5, wherein the longitudinal opening (84a-84g) forms part of the further channel.

7. The wiper device as claimed in claim 3, characterized in that a softer wind deflector subcomponent (32a-32g) comprises a longitudinal channel (82a-82g) which includes a triangular cross-section.

8. The wiper device as claimed in claim 1, characterized in that the wind deflector unit (22b-22g) bears against the retaining element (12b-12g)at least partially laterally in a region of the longitudinal guide channel (14b-14g).

9. The wiper device as claimed in claim 1, wherein the wind deflector unit (22a-22g) comprises two wind deflector subcomponents (32a-32g, 34a-34g) of different hardnesses, wherein a harder wind deflector subcomponent(34a-34g) closes the wind deflector unit (22a-22g) laterally, and wherein the retaining element (12a-12g) has a longitudinal opening (84a-84g), which opens the longitudinal guide channel (14a-14g) towards the wind deflector unit (22a-22g) at least partially.

10. The wiper device as claimed in claim 1, wherein the longitudinal guide channel (14a-14g) opens into the further channel, and wherein the further channel extends entirely axially through the wiper device along a longitudinal direction of the wiper device.

11. The wiper device as claimed in claim 1, wherein a width of each of the two supporting webs (72a-72g, 74a-74g) is constant moving along a direction away from the inner contour of the wind deflector unit (22a-22g).

12. The wiper device as claimed in claim 1, wherein the first portions of the channel walls (36a-36d, 38a-38d) are separated from one another by a gap.

* * * * *